June 6, 1933.  A. N. SMITH  1,912,545
ELECTRICALLY LIGHTED VEHICLE TOY
Filed Oct. 19, 1932  2 Sheets-Sheet 1
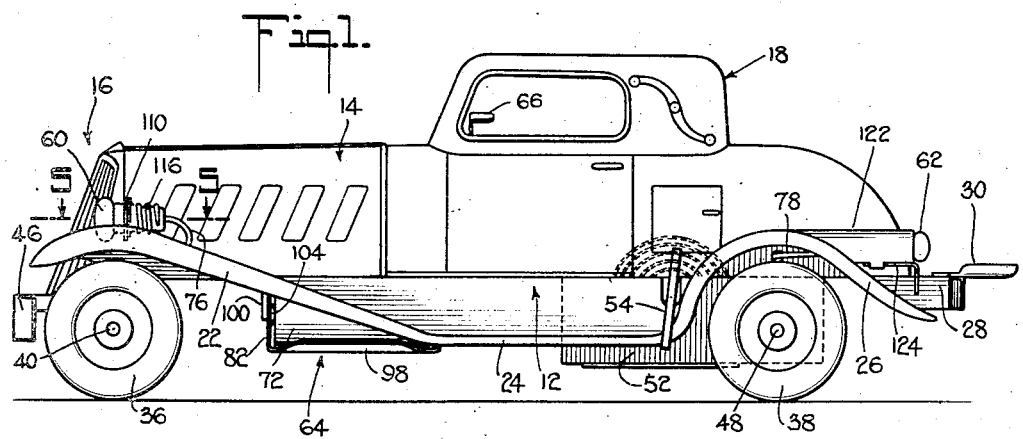
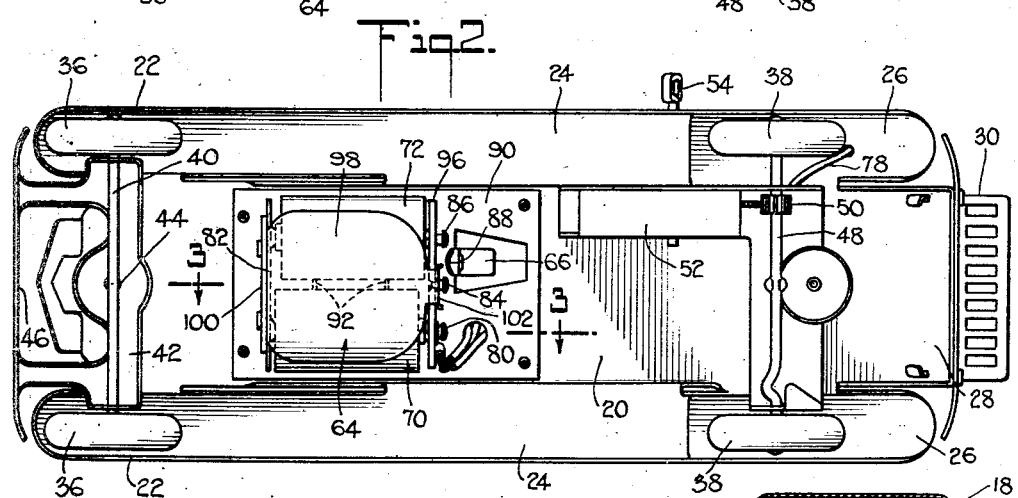
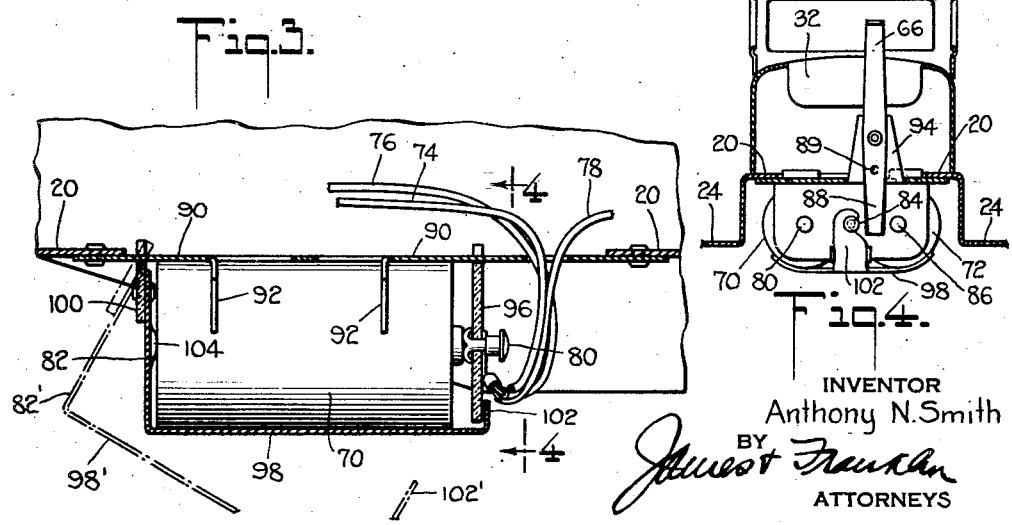
INVENTOR
Anthony N. Smith
BY
ATTORNEYS June 6, 1933.  A. N. SMITH  1,912,545
ELECTRICALLY LIGHTED VEHICLE TOY
Filed Oct. 19, 1932  2 Sheets-Sheet 2
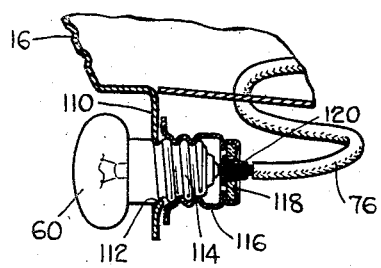
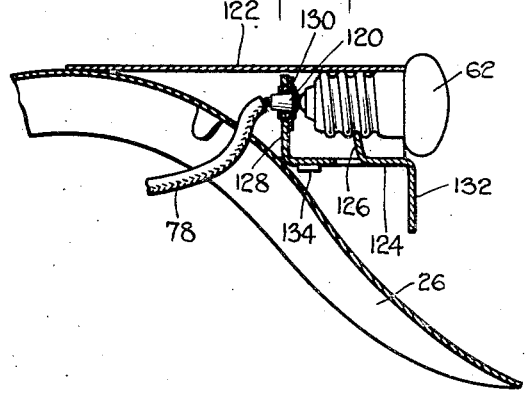
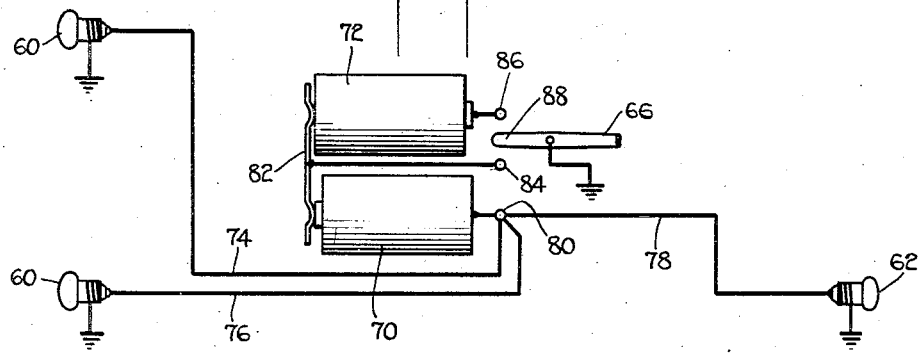
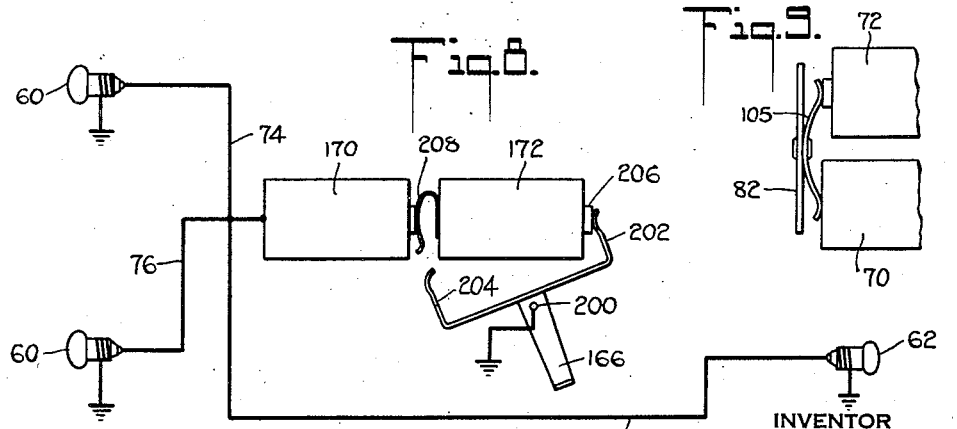
INVENTOR
Anthony N. Smith
BY
ATTORNEYS Patented June 6, 1933

1,912,545

UNITED STATES PATENT OFFICE

ANTHONY N. SMITH, OF GIRARD, PENNSYLVANIA, ASSIGNOR TO THE GIRARD MODEL WORKS INC., OF GIRARD, PENNSYLVANIA, A CORPORATION OF PENNSYLVANIA

ELECTRICALLY LIGHTED VEHICLE TOY

Application filed October 19, 1932. Serial No. 638,497.

This invention relates to vehicle toys, such as automobiles and the like, and more particularly to such toys provided with electric lighting systems.

Vehicle toys have been known for many years, and in recent times such toys have been improved by the provision of appropriate electric lighting systems. In the case of an automobile, for example, head lights and a tail light have been provided, energized from an appropriate battery which usually is of the standard flashlight type. The present invention relates to such vehicle toys, and the primary and general object of the invention is to improve such toys by the provision of a lighting system making optionally possible either bright or dim energization of the lights. A more particular object of the present invention is to provide such a lighting system which will produce either bright or dim energization of the lights without necessitating the use of resistors or like means for dimming the lights, and to instead provide a novel and simple switch system which avoids the necessity for wasting energy in a resistor or the like, and at the same time saves the relatively high initial cost of such a resistance unit.

Still another object of the present invention resides in the provision of a novel and improved housing or receptacle for receiving and supporting the battery, the said housing being so designed as to insure good contact with the cells of the battery and at the same time itself forming part of the switch circuit making possible the provision of bright or dim energization of the lights.

Further objects of the present invention center about the mode of support and contact with the lights themselves, the head lights and tail light being preferably of the standard flashlight type provided with a threaded base, for such lights are inexpensive and match the flashlight battery voltages. Still further objects of the present invention reside in the provision of lighting systems adapted for either parallel or tandem arrangement of a battery comprising a plurality of cells, so that either the parallel or tandem arrangement may be used as desired, depending upon the dimensions of the particular vehicle toy in which the bright and dim lighting system is to be incorporated.

To the accomplishment of the foregoing and such other objects as will hereinafter appear, my invention consists in the vehicle toy lighting system elements and their relation one to the other, as hereinafter are more particularly described in the specification and sought to be defined in the claims. The specification is accompanied by drawings, in which:

Fig. 1 is a side elevation of a figure toy embodying features of my invention;

Fig. 2 is an inverted plan view thereof;

Fig. 3 is a vertical section through the battery housing, taken in the plane of the line 3—3 in Fig. 2;

Fig. 4 is a vertical section showing the switch system, said section being taken in the plane of the line 4—4 in Fig. 3;

Fig. 5 is a horizontal section showing a detail of the head light mounting, this section being taken in the plane of the line 5—5 in Fig. 1;

Fig. 6 is a vertical section taken through the tail light housing;

Fig. 7 is a schematic diagram explanatory of the lighting system used in the vehicle toy shown in Figs. 1–4.

Fig. 8 is a schematic diagram of a modified form of lighting system in which the cells of the battery are positioned in tandem; and Fig. 9 is a detail of a modification.

Referring to Fig. 1 of the drawings, the vehicle toy is here exemplified by a toy coupé, but it will be understood that the toy may simulate any desired form of automobile or truck or fire engine, or the like. The toy body may be formed in accordance with known practice, and in the present case comprises, essentially, four parts each made of a single piece of sheet metal: first, the chassis member 12; second, the hood and body member 14; third, the radiator 16; and fourth, the top 18. The chassis member 12 consists of a piece of relatively heavy gauge sheet metal pressed to form a horizontal platform or bottom 20 having a width approximately equal to the width of the body member 14, forward mudguards 22, running boards 24, and rear mudguards 26. It may also include a rear platform 28 on which an appropriate oscillatable or folding luggage carrier 30 may be pivoted.

The body member 14 consists of a single piece of sheet metal pressed into an inverted trough formation, the top metal being cut away within the top 18 to clear the coupé body. A part of this metal may be bent downwardly to form a dashboard 32, as is best shown in Fig. 4, while the remaining portion of excess metal may be bent downwardly and then forwardly to form a seat within the coupé body, this seat not being visible in the drawings. The body member 14 is secured to the chassis member 12 by conventional tongue and slot connections. The top portion 18 is likewise stamped out of a single piece of sheet metal and is secured to the body member 14 by conventional tongue and slot connections. The radiator member 16 is also formed of a single piece of sheet metal and is secured to both the chassis member 12 and the body member 14 by appropriate tongue and slot connections.

The toy is mounted on front wheels 36 and rear wheels 38, these wheels being preferably molded out of solid rubber in simulation of regular automobile wheels. The forward wheels 36 are preferably arranged to steer, as by being mounted on an axle 40 itself mounted on a bracket 42 oscillatable about a king pin 44. The bracket 42 may be integrally formed with a front bumper 46. The rear wheels 38 may, if desired, be motor driven and in the present case are mounted on an axle 48 carrying a pinion 50 forming the last member in the gear train of a spring motor, generally indicated at 52, which carries the usual winding stem 54. The spring motor 52 is secured to the chassis member 12.

The vehicle toy is provided in the present case with head lights 60 and a tail light 62, these lights being energized from a battery carried in a battery housing 64 preferably located at the bottom of the vehicle, the energization of the lights being controlled by a manually operable switch or control means 66 located within the body of the vehicle. In accordance with the primary feature of my invention, the battery, the lights, and the manual control means are so interconnected as to make optionally available either bright or dim energization of the lights. Of course, the change in brightness of the lights may be obtained by the insertion of an appropriate resistance element in the lighting system, and such a modification I contemplate as coming within the scope of my invention. However, in accordance with further features and objects of the present invention, the use of any such variable or fixed resistance element is dispensed with, and instead the desired operation is obtained by a simple switch system not requiring the use of a resistance element and thereby avoiding waste of current as well as first cost of an appropriate resistance unit.

The manner in which this is done in the case of the present vehicle may best be explained by first referring to Fig. 7 of the drawings, which is a diagrammatic showing of the lighting system used in the toy of Figs. 1–4. Referring to Fig. 7, the battery comprises a pair of flashlight cells 70 and 72 arranged in parallel formation but reversed in polarity or direction. The head lights 60 and tail light 62 are all connected by appropriate wires 74, 76, and 78, to a common contact 80 bearing against one terminal of the cell 70. The opposite terminal of cell 70 is connected to the adjacent end of cell 72, as by the metallic plate 82, thus connecting the cells 70 and 72 in series. The metallic plate 80 is connected to one fixed switch contact 84, while the opposite terminal of cell 72 is connected to another fixed switch contact 86. Switch lever 66 has one end formed into a slidable contact 88 arranged to be moved into engagement with either of the contacts 84 and 86. The threaded base of each of the lights 60 and 62 is grounded to the body of the toy, and lever 66 is likewise grounded to the body of the toy. Consequently, upon movement of lever 66, bringing contact 88 into engagement with contact 86, the lights are energized by current at the full or added potential of the two cells 70 and 72, thus causing bright illumination of the lamps, these being selected, of course, to operate at the series potential of the two cells (ordinarily 2.3 volts). When, however, control lever 66 is moved in the opposite direction, bringing contact 88 into engagement with contact 84, the potential applied to the bulbs is reduced to half, and consequently the bulbs are only dimly though distinctly illuminated. Of course, by leaving the slidable contact 88 in the intermediate position between the contacts 84 and 86, the circuit is opened and the lights are extinguished. Control lever 66 therefore acts as a three-position lever and provides off, dim, and bright conditions for the lighting system.

Reverting now to Figs. 1–4, the battery cells 70 and 72 are carried in housing 64 beneath the vehicle body. The upper side of the housing may be formed of a single piece of sheet metal 90 secured to the platform 20 of the chassis member 12. It will be understood that, if desired, the platform member 20 may itself be appropriately stamped and shaped to act as the upper wall 90 of the housing. This wall 90 has struck upwardly therefrom a pair of lugs 92 which act as spacers for receiving and locating the cells 70 and 72 against transverse displacement. It is also provided with a lug 94, best shown in Fig. 4, which is struck upwardly from the plate 90 and acts as a fulcrum for the control lever 66.

The remainder of battery housing 64 is made up of an insulation end wall 96 and metallic end and bottom walls 82 and 98. The insulation wall 96 is secured to the plate 90 and is made of a sheet of fiber board or like insulation material. The metallic walls 82 and 98 are contiguous and formed from a single piece of sheet metal. The end wall 82 is riveted to a strip of insulation 100 which is itself preferably oscillatably secured to the plate 90. The insulation strips 100 and 96 may be secured to the plate 90 by the use of T projections anchored in appropriate slots in the plate. The insulation housing wall 96 is provided with three contacts, 80, 84, and 86, each preferably formed by the use of a split rivet or the like, as is best shown by the rivet 80 in Fig. 3. It will be recognized that the contacts 80, 84, and 86, as well as the metal plate 82, all correspond to the similarly numbered parts in Fig. 7 of the drawings.

The lower or insulated metallic part of the battery housing comprises not only the end wall 82 and the bottom wall 98, but also an upwardly bent hook 102 which engages the center contact 84, as is best shown in Fig. 4. The end plate 82 is provided with a pair of inwardly struck teats or contacts 104 which bear against the ends of the cells and insure contact therewith. If desired, a more flexible contact may be obtained by the use of a bowed resilient strip of steel, 105, secured to end plate 82, as is shown in Fig. 9. This arrangement is especially advantageous if the sheet metal of end plate 82 is heavy gauge, because some yieldability is desirable to insure good contact on both cells at the same time, despite manufacturing variations in dimension. The hook 102 engages and fits tightly against contact 84 and thereby forms an electrical connection between the opposite ends of the cells and the fixed contact 84. It will be observed that the end rivets 80 and 86 are spaced apart and are properly located to engage the ends of cells 70 and 72 respectively. The wires 74, 76, and 78, leading to the lights, are all connected in common to the rivet 80, as is clearly shown in Figs. 2 and 3. The control lever 66 is preferably positioned midway between the contacts 84 and 86 so that movement of the lever in opposite directions provides the half and full voltage energization of the lights, just as was explained in connection with Fig. 7. It may also be provided with a teat 89 (see Fig. 4) mating with a recess on lug 94 to normally locate the lever in the central or off position.

It will be understood that by disengaging the hook 102 from the center contact 84, the metal parts of the battery housing may be swung downwardly, as is indicated by the broken line position in Fig. 3, thereby opening the housing for the removal and replacement of the battery. In putting the cells into the battery housing, the only precaution which need be taken is that the cells should face oppositely, that is, that the carbon poles should be at opposite ends so that the connection formed by the plate 82 will connect the batteries in series rather than in parallel.

The mounting of the head lights and tail light on the toy vehicle will next be described. The radiator member 16 is provided with a pair of outwardly or sidewardly extending brackets 110 each apertured to receive a head light bulb. The construction is shown in detail in Fig. 5, and it will be observed that the edge 112 of the aperture is appropriately spiraled to form a thread for receiving the threaded base 114 of lamp 60. This at the same time insures grounding of the lamp to the vehicle body. A separate threaded cap 116 is additionally screwed onto the lamp base 114, preferably after the lamp has been threaded into bracket 110. The cap 116 is flanged at its rear end to receive and hold an insulation washer 118. This in turn is centrally apertured and receives an eyelet 120 only the inner end of which is flanged, the outer end being left in its tubular or unflanged condition. The insulation of feed wire 76 is cut away at the end, and the metallic conductor is passed through the eyelet 120 and is soldered to the inner or flanged end thereof. This end then acts as a contact for engaging the center contact of the bulb. It will be understood that in actual manufacture the eyelet 120 is first soldered to the ends of the conductors 74, 76, and 78, and that the conductors are thereafter threaded through the insulation washers 118, the movement of the wire being stopped when the flanged inner end of eyelet 120 reaches the insulation washer. Accurate and dependable contact is thus provided at a minimum of manufacturing cost.

The tail light 62 is supported in a tail light housing consisting of an upper member 122 and a lower member 124. The tail light housing extends rearwardly from the rear mudguards 26, as is best shown in Fig. 1. In order to present a smooth unmarred appearance the upper portion 122 of the housing is formed from a single piece of sheet metal bent into arcuate or trough-shaped cross-section and inverted to bring the curved surface uppermost. The forward end of the housing is cut on the bias to mate with the sloping surface of the mudguard 26 and is provided with appropriate tongues which pass through slots in the mudguard to lock the tail light housing in place. The bottom member 124 of the housing consists of a single piece of sheet metal which has struck upwardly therefrom a lug 126 which acts as a thread permitting the threaded base of lamp 62 to be screwed into the housing. It also holds the lamp against the upper member 122 of the housing, thereby insuring grounding of the lamp base. The forward end 128 of the bottom member 124 may be bent upwardly within the housing and provided with an insulation washer 130 for supporting a central contact which may be in the form of an eyelet 120, such as has already been described in connection with the head lights. The rear end of the bottom member 124 may be bent downwardly, as is indicated at 132, in imitation of a license plate adapted to be illuminated by the tail light. The entire bottom member 124 is held upwardly against the lower edges of the upper member 122 by inwardly bent lugs 134 formed integrally with the upper housing member 122. It will thus be seen that the tail light is supported in a housing consisting essentially of only two pieces of sheet metal one of which is left smooth and unmarred in appearance, and the other of which is appropriately shaped to provide a thread and support for the lamp bulb, a support for the center contact for the lamp bulb, and, if desired, a simulated license plate for the vehicle.

As so far described the battery consists of two cells arranged side by side beneath the vehicle. In some cases, because of the dimension or/and arrangement of the parts of the vehicle, it may prove more convenient to arrange the cells in end to end or tandem. This requires only a slight modification of the switching arrangement, and such a modification is shown in Fig. 8 in which the head lights 60, the tail light 62, and the interconnecting wires 74, 76, and 78 all correspond to similar elements indicated in Fig. 7 of the drawings. However, in the present case the battery comprises two cells, 170 and 172 which are arranged in end to end relation. These cells are similarly directed, that is, the carbon poles point in the same direction so that the cells if brought into contact are connected in series. A control lever 166 is provided which is pivoted and grounded at 200. It is provided with a pair of movable contacts 202 and 204 which are arranged to be moved alternately into contact with the battery. These contacts are so positioned, however, that contact 202 moves into engagement with the extreme pole 206 of the battery, while contact 204 moves into engagement with the center or common connection of the cells 170 and 172. For convenience, a spring element 208 may be arranged between the cells 170 and 172, thereby insuring contact of one cell with the other, and also of the outer ends of the cells with their respective contacts. It will be understood that the contacts may be so disposed that at an intermediate position neither contact engages the battery, so that the lights are deenergized and extinguished. However, upon movement in one direction the lights are energized by only one of the cells, thus producing the dim condition. Upon movement of the control lever 166 in the opposite direction the contact is made with the two cells in series, thereby energizing the lights at full voltage and producing the bright condition. It will be understood that while contacts 202 and 204 have been shown arranged for a rocking movement in Fig. 8, it is possible and desirable in a practical installation to arrange the contacts 202 and 204 for oscillation with a common shaft extending parallel to the axis of the batteries, the control lever 166 being arranged to oscillate said shaft about its own axis. The movement of contact levers 202 and 204 is then a sliding movement, contact 202 sliding across the end of cell 172, and contact 204 sliding between the two cells at their point of common contact.

It is believed that the mode of constructing and using the present invention, as well as the many advantages thereof, will be apparent from the foregoing detailed description. The toy vehicle is provided with an efficient and economical lighting system which, despite its simplicity, makes possible the provision of dim and bright lights. The effect produced is an exceedingly realistic and attractive one which adds very greatly to the play value of the toy. The desired result is preferably accomplished without the use of resistors with attendant expense and energy waste. The cells of the battery may be arranged in any of a number of ways, as side by side, or end to end, according to convenience in any particular case. When arranged side by side they may be housed in a partially metallic housing which itself acts as a part of the electrical circuit. The contact with the lamps is simplified by grounding the intermediate threaded base of the lamp, and using a simple inexpensive flanged eyelet for central contact with the lamp. The tail light is supported in an attractive housing, fulfilling many desirable functions while consisting of only two pieces of sheet metal.

As has already been explained, the bright and dim effect may be obtained in other ways, as by the use of a resistor. Using my preferred switching arrangement, it will be understood that the battery may consist of more than two cells, and that contact may in such case be made for more than two degrees of brightness, but, of course, the preferred arrangement uses only two cells, as disclosed, corresponding to the usual dim and bright illumination used on standard motor vehicles. It has also been explained that the switching arrangement may be modified according to the positioning and arrangement of the cells of the battery. It should further be understood that the switching system may, if desired, be further complicated so that in the dim condition the two cells will be connected in parallel instead of only one cell being used, but the latter arrangement is here preferred and is herein disclosed in order to minimize the cost of the toy. It will also be understood that the present invention may be practiced by changing the head lights from a parallel to a series arrangement, and vice versa, without changing the battery, and in such case the invention may be practiced while using only a single cell battery.

It will therefore be apparent that while I have shown and described my invention in preferred forms, many changes and modifications may be made in the structures disclosed without departing from the spirit of the invention, defined in the following claims.

I claim:

1. A toy comprising a sheet metal body simulating vehicle, said body being provided with lights, a two-cell battery receptacle at the bottom of said vehicle comprising a sheet metal housing insulatedly mounted on the toy body and holding a pair of cells in reverse parallel relation, said metal housing contacting with a pair of adjacent ends of the cells and also a low voltage contact, two additional insulatedly mounted contacts for engaging the opposite ends of said cells, one of said contacts acting as a high voltage contact and the other being connected by wiring to the aforesaid lights, the other terminals of said lights being grounded to the body of the vehicle, and a switch mounted and grounded on said vehicle body and movable between the aforesaid low and high voltage contacts.

2. A toy comprising a sheet metal body simulating a vehicle, said body being provided with lights, a two-cell battery receptacle at the bottom of said vehicle comprising an insulation end wall and a sheet metal housing cover including an opposite end wall insulatedly mounted on the toy body, a bottom wall, and a connection mounted on the insulation end wall, the metallic end wall being provided with a pair of spaced contacts arranged to engage the ends of cells positioned in parallel but mutually reversed relation in the receptacle, the insulation end wall being provided with end contacts for engaging the opposite ends of said cells, one of said contacts being connected by wiring to the aforesaid lights, the other terminals of said lights being grounded to the body of the vehicle, and a switch mounted and grounded on said vehicle body movable between the center and opposite end contact, thereby connecting either one or the two batteries to the lights in order to respectively provide for dim or bright illumination thereof.

3. A toy vehicle comprising a sheet metal body simiulating an automobile, said body being provided with head and tail lights, a two-cell battery receptacle at the bottom of said vehicle comprising a sheet metal housing cover having an end wall insulatedly and oscillatably mounted on the toy body, a bottom wall, and an opposite end hook arranged for mechanical engagement with a central switch contact mounted on an opposite end wall, the latter end wall being made of insulation, the metallic end wall being provided with a pair of spaced resilient contacts arranged to engage the ends of cells positioned in parallel but mutually reversed relation in the housing, the insulation end wall being provided with end contacts for engaging the opposite ends of said cells, one of said contacts being connected by wiring to the aforesaid lights, the other terminals of said lights being grounded to the body of the vehicle, and a switch mounted on and electrically connected to said vehicle body movable between the center and opposite end contact, thereby connecting either one or the two cells to the lights in order to respectively provide for dim or bright illumination thereof.

4. A toy vehicle comprising means to hold a lamp bulb intermediate the glass and threaded base, a separate threaded cap adapted to be screwed around the end of the base of said bulb, the end of said cap being provided with an insulation washer, and a feed wire the end of which passes through said washer and contacts with the central contact of the bulb, said cap being supported solely by said bulb and serving to hold the end of the feed wire in contact with the bulb.

5. A toy vehicle comprising an apertured sheet metal lug the internal edges of which are so displaced as to act as a screw thread for receiving, supporting, and grounding a flashlight type of lamp bulb, a separate threaded cap screwed around the free end of the threaded base of said bulb, the end of said cap being provided with an insulation washer, and a feed wire the end of which passes through said washer and contacts with the central contact of the flashlight bulb, said cap being supported solely by said bulb and serving to hold the end of the feed wire in contact with the bulb.

6. A toy vehicle comprising a sheet metal vehicle body simulating an automobile, said vehicle body including a sheet metal radiator simulation having sidewardly projecting apertured lugs the internal edges of which are so displaced as to act as screw threads for receiving, supporting and grounding flashlight type of head lamp bulbs, separate threaded caps adapted to be screwed around the free ends of the threaded bases of said bulbs, the end of each cap being provided with an insulation washer, eyelets having flanged ends and tubular bodies positioned in said apertured insulation washers, and a feed wire the end of which passes through said eyelets and is soldered to the internal flanged end thereof which contacts with the central contact of the flashlight bulbs, said caps being supported solely by the threaded bases of said bulbs and serving to hold the eyelets in contact with the bulbs.

7. A toy vehicle comprising a sheet metal toy body simulating an automobile, a generally tubular tail light housing extending rearwardly from said body, the bottom wall of said housing being provided with an upwardly struck lug acting as a thread for engaging the thread on the bulb and holding the bulb against the top wall of the housing.

8. A toy vehicle comprising a sheet metal toy body simulating an automobile provided with mudguards, a tail light housing for said vehicle including an inverted trough-like sheet metal member extending rearwardly from a rear mudguard, the open lower side of said member being closed by a sheet metal bottom the forward end of which is bent upwardly and provided with insulated contact means for engaging the center contact of a flashlight bulb, the bottom wall being provided with an upwardly struck lug engaging the thread on the bulb and holding the bulb against the arcuate top wall of the housing.

9. A toy vehicle comprising a sheet metal toy body simulating an automobile provided with mudguards, a tail light housing for said vehicle including an inverted trough-like sheet metal member extending horizontally rearwardly from a rear mudguard, the open lower side of said member being closed by a sheet metal bottom the forward end of which is bent upwardly and provided with insulated contact means for engaging the center contact of a flashlight bulb, the bottom wall being provided with an upwardly struck lug acting as a thread for engaging the thread on the bulb and holding the bulb against the arcuate top wall of the housing, the rear end of said bottom plate being bent downwardly in simulation of an automobile license plate.

10. An electric lighting system for a toy vehicle comprising lights, a pair of flashlight battery cells, means connecting said lights to one end of one of said cells, means grounding the other terminals of said lights, a pair of fixed contacts, a grounded lever movable between said contacts, means connecting the opposite end of the aforesaid cell to the second cell in series and to one of said fixed contacts, and means connecting the opposite end of the second cell to the other of said fixed contacts, whereby movement of the switch may be used either to connect the lights to one of the cells, or to connect the lights to the two cells in series.

11. An electric lighting system for a toy vehicle comprising head and tail lights, a pair of flashlight battery cells arranged in end to end contact, means connecting the lights to one end of said battery, means grounding the other terminals of said lights, and a grounded switch lever provided with a pair of contacts arranged to be moved into engagement with said battery, one of said contacts moving in a path between the cells, and the other of said contacts moving in a path engaging the opposite end terminal of the battery, whereby movement of the switch may be used either to connect the lights to one of the cells or to connect the lights to the two cells in series.

12. An electric lighting system for a toy automobile vehicle comprising head and tail lights, a pair of flashlight battery cells arranged end to end, means connecting said lights to one end of said battery, means grounding the other terminals of said lights, resilient means between said cells for causing series contact therebetween, and a grounded switch lever provided with a pair of contacts arranged to be alternately moved into engagement with said battery, one of said contacts moving in a path engaging the cells at their common point, and the other of said contacts moving in a path engaging the opposite end terminal of the battery, whereby movement of the switch may be used either to disconnect the lights from the battery, or to connect the lights to one of the cells, or to connect the lights to the two cells in series.

Signed at Girard, in the county of Erie and State of Pennsylvania this 17th day of October, A. D. 1932.

ANTHONY N. SMITH.